United States Patent [19]

Bianco et al.

[11] Patent Number: 5,374,818
[45] Date of Patent: Dec. 20, 1994

[54] IDENTIFICATION MEANS WITH INTEGRAL MEMORY DEVICE

[75] Inventors: James S. Bianco, Enfield, Conn.; David J. Horan, Westfield, Mass.

[73] Assignee: Control Module Inc., Enfield, Conn.

[21] Appl. No.: 848,242

[22] Filed: Mar. 9, 1992

[51] Int. Cl.⁵ .............................................. G06F 7/08
[52] U.S. Cl. .................................. 235/492; 235/381; 235/382
[58] Field of Search ............... 235/380, 381, 382, 492; 257/679

[56] References Cited

U.S. PATENT DOCUMENTS

| | | | |
|---|---|---|---|
| 3,906,201 | 9/1975 | Housman et al. | 235/61.7 B |
| 4,511,796 | 4/1985 | Aigo | 235/492 |
| 4,563,575 | 1/1986 | Hoppe et al. | 235/492 |
| 4,603,249 | 7/1986 | Hoppe et al. | 235/492 |
| 4,682,224 | 7/1987 | Ragan et al. | 380/16 |
| 4,764,666 | 8/1988 | Bergeron | 235/380 |
| 4,772,782 | 9/1988 | Nonat | 235/380 |
| 4,841,133 | 6/1989 | Gercekci et al. | 235/380 |
| 4,843,225 | 6/1989 | Hoppe | 235/492 |
| 4,845,347 | 7/1989 | McCrindle et al. | 235/380 |
| 4,943,708 | 7/1990 | Simmons et al. | 235/492 |
| 5,175,424 | 12/1992 | Lisimaque | 235/380 |

FOREIGN PATENT DOCUMENTS

| | | |
|---|---|---|
| 402182 | 12/1990 | European Pat. Off. |
| 2547457 | 12/1984 | France |
| 3804361 | 9/1988 | Germany |
| 1119890 | 5/1989 | Japan |
| 1292489 | 11/1989 | Japan |
| 2-58191 | 2/1990 | Japan |

Primary Examiner—E. Rollins Cross
Assistant Examiner—Erick Solis
Attorney, Agent, or Firm—John H. Crozier

[57] ABSTRACT

In one preferred embodiment, a memory device for insertion and retention in a hole defined in a planar identification card having upper and lower surfaces, the memory device comprising: electronic circuitry disposed in a cylindrical housing having upper and lower surfaces; the housing being held substantially within the hole after being snapped thereinto; and the housing having a total height substantially the same as the thickness of the card. In a further aspect of the invention, electronic circuitry in the housing is accessible by temporary attachment to an electronic terminal, the electronic circuitry being powered by a charged capacitor, the capacitor being adapted to be charged by the terminal with a charge sufficient to power the electronic circuitry for only a selected period of time. The capacitor may be charged over a communication line to the memory device. The memory may be disabled if a use limitation stored therein is exceeded.

16 Claims, 3 Drawing Sheets

IDENTIFICATION MEANS WITH INTEGRAL MEMORY DEVICE

BACKGROUND OF THE INVENTION

1. Field of the Invention

The present invention relates to identification means, generally, and, more particularly, but not by way of limitation, to identification means having memory means economically and conveniently disposed therein and which memory means has stored therein limitations as to the valid times and/or numbers of uses of the identification means.

2. Background Art

Identification means, such as identification cards, are widely used in a variety of contexts and may be used as bank cards, credit cards, club membership cards, and cards for ski area and amusement park use, etc. Frequently, such cards have identifying indicia thereon which may include an identification number or a photograph. Often, in an attempt to prevent forging of such cards, the cards may also include bar codes, magnetic strips, and/or holographic images disposed thereon. However, relatively inexpensive photo and electronic reading, copying, and encoding device have become widely available to assist in forging such cards.

To hinder forging of identification cards, some cards are constructed with electronic circuitry therein to further identify the genuineness of the cards. However, such cards are expensive to manufacture and require special tooling to insert the circuitry in the card during manufacture the manufacturing process thereof.

In a recent attempt to make identification cards more secure, small memory devices, or "touch memories," containing identification information are being adhesively attached to identification cards. When access is desired to a restricted area, for example, the touch memory is read in a reading device and the holder given or denied access depending on whether or not the card is valid or invalid. A further use of touch memories is on debit cards with which one may pay for a service or services up to some total amount set in the touch memory. A substantial disadvantage of such devices, however, is that the adhesive used is extremely expensive and can cost as much as $0.06 per card for the small amount of adhesive.

In another conventional use of the touch memory, the touch memory is inserted in a hole in the card and held therein by means of a retainer ring.

A disadvantage of such cards is that, since the touch memory includes a battery therein, the height of the touch memory is substantially greater than the thickness of the card and, therefore, the touch memory protrudes a substantial distance from the surface of the card, regardless of the method of attachment, making it inconvenient to slide the card into a wallet, for example.

A limitation of all such known identification cards is that there is no known way to disable such cards from further use when validity time periods or use limits have been exceeded.

Accordingly, it is a principal object of the present invention to provide means of affixing a device to store validation information onto an identification card without changing the manufacturing process for the card itself.

It is an additional object of the invention to provide an identification card with an electronic memory affixed thereto such that the overall thickness of the total package is essentially the same as that of the identification card alone.

It is a further object of the invention to provide means to permanently disable from use an identification card that is identified as no longer being valid.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in one preferred embodiment, a memory device for insertion and retention in a hole defined in a planar identification card having upper and lower surfaces, said memory device comprising: electronic circuitry disposed in a cylindrical housing having upper and lower surfaces; said housing being held substantially within said hole after being snapped thereinto; and said housing having a total height substantially the same as the thickness of said card. In a further aspect of the invention, electronic circuitry in said housing is accessible by temporary attachment to an electronic terminal, said electronic circuitry being powered by a charged capacitor, said capacitor being adapted to be charged by said terminal with a charge sufficient to power said electronic circuitry for only a selected period of time. The capacitor may be charged over a communication line to said memory device. Said memory device may be disabled if a use limitation stored therein is exceeded.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
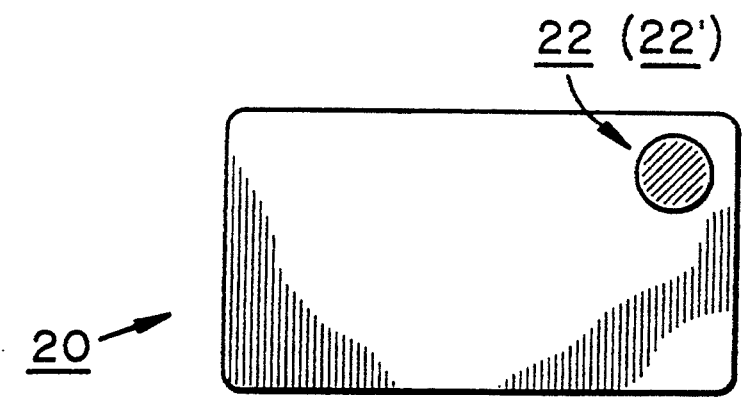
FIG. 1 is a top plan view of an identification card with a memory device therein, according to the present invention.

Reference should now be made to the Drawing, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

Figure 2:
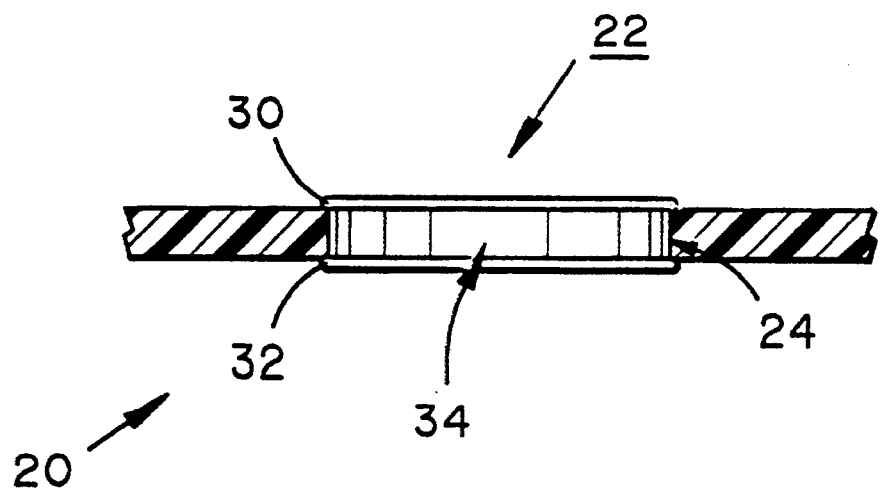
FIG. 2 is a fragmentary, side elevational view, partially in cross-section, of one arrangement of the card of FIG. 1.

FIGS. 1 and 2 illustrate a plastic identification card, generally indicated by the reference number 20, having disposed therein an environmentally hardened, metal encased memory device, generally indicated by the reference numeral 22, inserted in a cylindrical hole 24 (FIG. 1) defined in the identification card. Identification card 20 may also include conventional identifying indicia thereon (not shown), so memory device 22 will desirably be located in a portion of the identification card where such identifying indicia are absent.

Memory device 22 is circular in plan view (FIG. 1) and has a height (FIG. 2) which is only slightly greater than the thickness of the plastic portion of credit card 20. Formed around the upper and lower peripheries of memory device 22 are outwardly facing upper and lower ridges 30 and 32 (FIG. 2), respectively, defining therebetween an annular concave channel 34 around the circumference of the memory device, the ridges closely engaging the upper and lower surfaces of the memory device. The root of channel 34 has a diameter less than the diameter of hole 24, while the diameters of upper and lower ridges 30 and 32 are greater than the diameter of the hole, the differences between the diameters of the channel, the ridges, and the hole being such that memory device 22 is secured in identification card 20.

Figure 5:
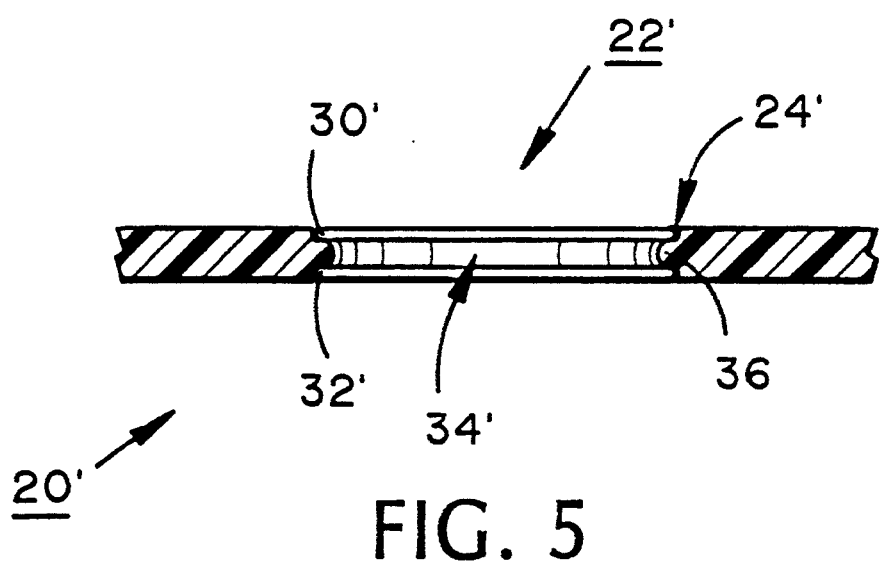
FIG. 5 is a fragmentary, side elevational view, partially in cross-section, of another arrangement of the card of FIG. 1.

FIG. 5 illustrates an alternative arrangement to memory device 22, here a memory device, generally indicated by the reference numeral 22' inserted in a hole 24' formed in a credit card 20'. Memory device 22' is circular in plan view (FIG. 1) and has a height (FIG. 5) which is essentially the same as the thickness of the plastic portion of a credit card 20' in which it is inserted. Formed around the upper and lower peripheries of memory device 22' are outwardly facing upper and lower ridges 30' and 32', respectively, defining therebetween an annular concave channel 34' around the circumference of the memory device, the ridges closely engaging an inwardly facing flange formed around hole 24'. Flange 36 may be formed in a suitable stamping operation or it may be formed by the plastic deformation of card 20' as memory device 22' is snapped into the card.

A substantial advantage of the present invention is that the body of plastic identification card 20 or 20' can be manufactured by conventional methods using conventional manufacturing equipment. Following conventional manufacture, if memory device is to be inserted therein, hole 24 or 24' is punched. Then, memory device 22 or 22' is snapped into hole 24 or 24', by the temporary elastic deformation of the edge of the hole, and the manufacturing process is complete. Alternatively, hole 24 or 24' may be punched during the manufacturing process and the insertion of memory device 22 or 22' may take place later depending on the use of the device, as will be described in detail below. A further advantage of having memory device 22 or 22' snapped into hole 24 or 24' is that the memory device may also be conveniently snapped out of the hole for replacement if desired, again depending on the use.

Thus, the thickest portion of identification card 20 or 20' with memory device 22 or 22' therein is little more than the thinnest portion and the identification card is easily and conveniently handled. Furthermore, manufacture of identification card 20 or 20' with memory device 22 or 22' therein is economical and requires only the addition of inexpensive punching and insertion steps to the manufacturing operation, without the cost of additional materials such as adhesives.

Figure 3:
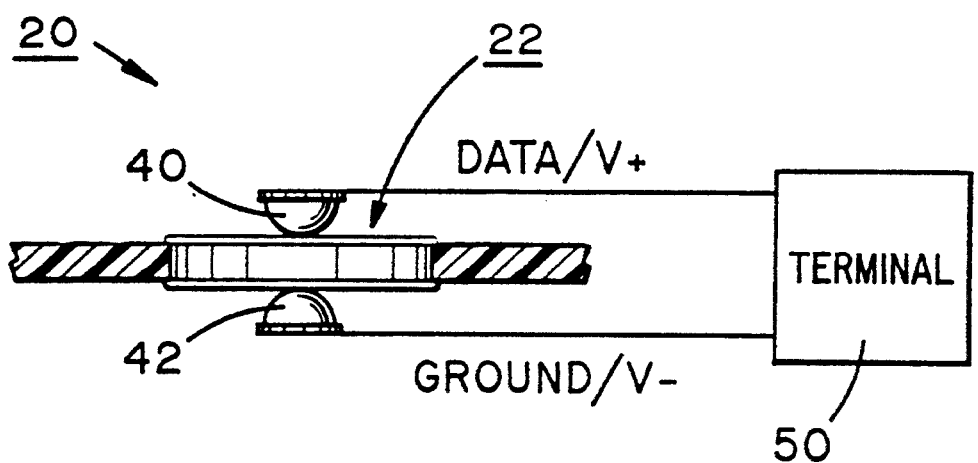
FIG. 3 is a fragmentary, side elevational view, partially in cross-section and partially schematic, of means for reading the memory device of FIGS. 1 and 2.

FIG. 3 illustrates how communication with memory device 22 may be accomplished. (Communication with memory device 22' would be identical.) Here, card 20 has been inserted into a reading device (not fully shown) which includes spring loaded contacts 40 and 42 which engage opposite sides of the memory device and serve, respectively, as DATA/V+ and GROUND/V− connections to the memory device. Contacts 40 and 42 are connected to terminal 50.

Figure 4:
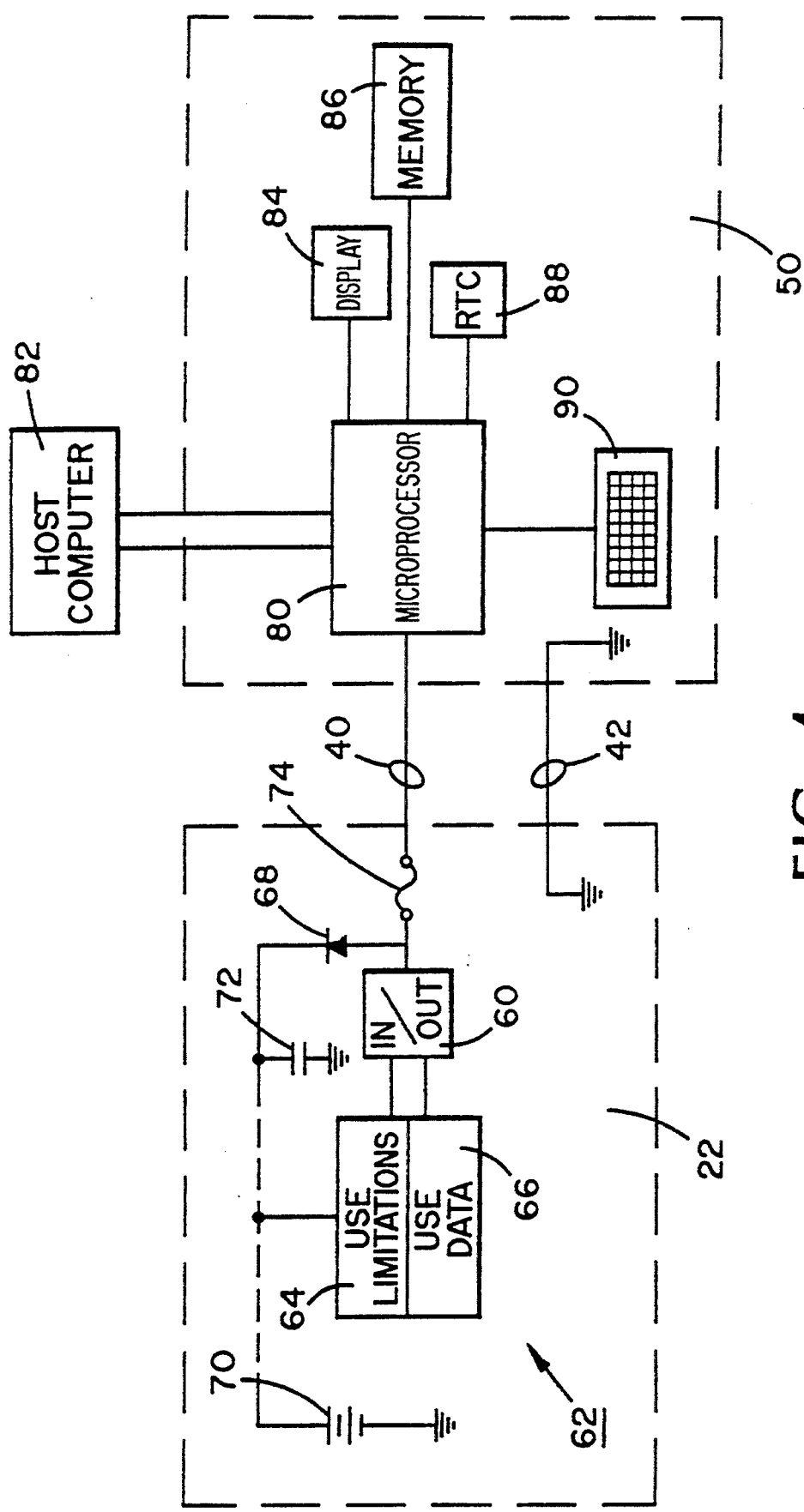
FIG. 4 is a schematic diagram showing the memory device of FIGS. 1-3 in communication with external electronic circuitry.

FIG. 4 illustrates memory device 22 connected to terminal 50. (The use of memory device 22' would be identical.) Memory device 22 includes input/output circuitry 60 connected to a memory, generally indicated by the reference numeral 62. Memory 62 has a use limitation section 64 and may also have a use data section 66. Memory 62 may be of the battery-backed-up type, similar to the "touch memory" furnished by Dallas Semiconductor, Dallas, Tex., in which case the memory would be powered by a battery 70; or the memory may be of the non-volatile EEPROM type, in which case there would be no power back-up; or the memory may be of the capacitor-backed-up type, in which case the memory would be powered by a capacitor 72. An isolation diode 68 is provided to prevent discharge of the powering device to an external connection. Memory device 22 may also have a fusible element 74 disposed in the DATA/V+ lead to input/output circuitry 60.

Terminal 50 includes a microprocessor 80 which may be connected to a host computer 82. Connected to microprocessor 80 may be a display 84, a memory 86, a real time clock 88, and/or a keyboard 90.

Various elements of memory device 22 and terminal 50 have been described as being possibly included through the use of the term "may," since those elements may or may not be present depending on the application in which the memory device and the terminal are used, as is described below.

One use for the present invention is to validate identification card 20 (FIG. 1) for a specified period of time, say one day, one week, or one weekend. Typical applications include using identification card 20 for access to ski lifts at a ski area, access to rides at an amusement park, and the like. In such an application, a user might purchase an identification card 20 from an attendant. The attendant would temporarily attach memory device 22 to a terminal 50 (FIGS. 3 and 4) and, through use of keyboard 90, store in memory section 64 of the memory device the period of time for which identification card 20 is to be valid. If memory device 22 had not yet been inserted in identification card 20, such would now be done. The user would, say, then proceed to a validation terminal 50 at a ski lift. Identification card 20 would be inserted in the validation terminal 50. Microprocessor 80 would read the use restrictions in memory section 64, check the time on real time clock 88, and then could display VALID or INVALID, depending on the use limitations stored in memory section 64 and the then current time in real time clock 88. If the period of validity of identification card 20 has expired, the user can return to the attendant and pay for an additional period of validity and the attendant would either reprogram the existing memory device 22 for an additional period of time or insert a new memory device with an additional period of validity stored therein.

Terminal 50 may be connected to host computer 82 to input information as to the numbers of transactions, etc., which may have been temporarily stored in its memory 86, or it may receive information from the host computer relative to the invalidity of certain cards, etc.

In a similar manner, memory device 22 could be programmed to permit use of identification card 22 for a selected number of total uses or a selected number of uses within a selected time period. In such a case, microprocessor 80 would enter in memory section 66, each use, and the time and date of such use, if the latter were desired. This information would be read by terminal 50 each time the card were used to determine the number of uses remaining.

In another type of application, it may be desired to have a rather lengthy period of validity, but to require a minimum period of time between uses. For example, in a food distribution program, it may be desired to have an identification card valid for a period of a year, but to limit the distribution of food to the user to once a day within that one-year period. In this case, such use restrictions would be entered in memory section 64 and, when identification card 20 were presented to obtain a food distribution, microprocessor 50 would check the then current time in real time clock 88 and the limitations in memory section 66 to see if a distribution had occurred in the then current day and, then, authorize or not a food distribution. If a distribution is then made, the time and date thereof would be noted in memory section 66. When the year's period of validity expires, no further authorizations would be made and the user would have to obtain a new identification card 20 or a new or reprogrammed memory device 22.

The application set forth immediately above lends itself well to the use of a memory device 22 having memory 62 backed up by capacitor 72. In this case, and assuming the limitations of the example immediately above, each time identification card 20 is used to obtain a food distribution, the time and date are noted in memory section 66 and capacitor 72 is given a charge sufficient to sustain memory 62 for a relatively short period, say, two days. Thus, when the user presents identification card 20 the next day, memory 62 will be able to furnish the last date of use. If the next use is beyond two days, the memory will be dead, but it will be evident from that fact that a food distribution has not been made during the then current day. An advantage of this arrangement is that relatively expensive long life batteries or EEPROMs need not be used.

Should a user present identification card 20 the period of which has expired or the number of uses of which has been exhausted, as a security measure, microprocessor 80 can program input/output circuitry 60 to refuse any further attempts to use memory device 22. Alternatively, in such cases, microprocessor 80 may transmit a voltage pulse to memory device 22 sufficient to open or disable fusible element 74, thus permanently disabling the memory device, and the user would be required to obtain a new memory device before again using identification card 20.

When identification card 20 is presented, terminal 50 may check a laser etched serial number, or a permanently programmed serial number, in memory device 22 to see if that card is on an "Invalid" list furnished by host computer 82 and/or stored in memory 86. If identification card 20 is on the list, the attendant may be so alerted and/or microprocessor 80 may disable memory device 22 in one of the ways noted above.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

We claim:

1. A memory device for insertion and retention in a hole defined in a planar identification card having upper and lower surfaces, said memory device comprising:
    (a) electronic circuitry disposed in a cylindrical housing having upper and lower surfaces, said housing having outwardly facing flanges formed around the outer peripheries of said upper and lower surfaces, forming therebetween an annular concave channel having a root portion, said flanges having a diameter slightly greater than the diameter of said hole and said root portion of said concave channel having diameter slightly less than said diameter of said hole;
    (b) said housing being held substantially within said hole after being snapped thereinto by the temporary elastic deformation of the periphery of said hole by said housing as said housing is inserted in said hole; and
    (c) said housing having a total height substantially the same as the thickness of said card.

2. A memory device, as defined in claim 1, wherein said housing may be snapped into said hole and held therein by the engagement of said upper and lower surfaces with said flanges.

3. A memory device as defined in claim 1, wherein said housing may be snapped into said hole and held therein by the engagement of said concave channel with an annular convex flange formed around said hole.

4. A memory device for attachment to identification means, said memory device comprising: electronic circuitry therein accessible by temporary attachment to an electronic terminal, said electronic circuitry being powered by a charged capacitor, said capacitor being adapted to be charged by said terminal with a charge sufficient to power said electronic circuitry for only a selected period of time, said capacitor being charged over a data communication line to said memory device when said memory device is temporarily attached to said terminal.

5. A memory device, as defined in claim 4, wherein said terminal is adapted to recharge said capacitor each time said identification means is temporarily attached to said terminal.

6. A memory device, as defined in claim 4, wherein said identification means is a planar card having a hole defined therethrough and having upper and lower surfaces, and said memory device further comprises:
    (a) electronic circuitry disposed in a cylindrical housing having upper and lower surfaces;
    (b) said housing being held substantially within said hole after being snapped thereinto by the temporary elastic deformation of the periphery of said hole by said housing as said housing is inserted in said hole; and
    (c) said housing having a total height substantially the same as the thickness of said card.

7. A memory device, as defined in claim 6, further comprising: said housing having outwardly facing flanges formed around the outer peripheries of said upper and lower surfaces, forming therebetween an annular concave channel having a root portion, said flanges having a diameter slightly greater than the diameter of said hole and said root portion of said concave channel having diameter slightly less than said diameter of said hole, such that said housing may be snapped into said hole and held therein by the engagement of said upper and lower surfaces with said flanges.

8. A memory device as defined in claim 6, further comprising: said housing having outwardly facing flanges formed around the outer peripheries of said upper and lower surfaces, forming therebetween an annular concave channel having a root portion, said flanges having a diameter slightly greater than the diameter of said hole and said root portion of said concave channel having diameter slightly less than said diameter of said hole, such that said housing may be snapped into said hole and held therein by the engagement of said concave channel with an annular convex flange formed around said hole.

9. A memory device for attachment to identification means, said memory device having stored therein data as to limitations of use of said identification means, electronic circuitry therein accessible by temporary attachment to an electronic terminal with a single connection over which data is communicated, said electronic circuitry including fusible means, and said electronic terminal being adapted to provide an electrical charge to said fusible means over said single connection to open said fusible means and disable said memory device when said electronic terminal determines that said limitations of use have been exceeded.

10. A memory device, as defined in claim 9, wherein said identification means is a planar card having a hole defined therethrough and having upper and lower surfaces, and said memory device further comprises:
(a) electronic circuitry disposed in a cylindrical housing having upper and lower surfaces;
(b) said housing being held substantially within said hole after being snapped thereinto by the temporary elastic deformation of the periphery of said hole by said housing as said housing is inserted in said hole; and
(c) said housing having a total height substantially the same as the thickness of said card.

11. A memory device, as defined in claim 9, further comprising: said housing having outwardly facing flanges formed around the outer peripheries of said upper and lower surfaces, forming therebetween an annular concave channel having a root portion, said flanges having a diameter slightly greater than the diameter of said hole and said root portion of said concave channel having diameter slightly less than said diameter of said hole, such that said housing may be snapped into said hole and held therein by the engagement of said upper and lower surfaces with said flanges.

12. A memory device as defined in claim 9, further comprising: said housing having outwardly facing flanges formed around the outer peripheries of said upper and lower surfaces, forming therebetween an annular concave channel having a root portion, said flanges having a diameter slightly greater than the diameter of said hole and said root portion of said concave channel having diameter slightly less than said diameter of said hole, such that said housing may be snapped into said hole and held therein by the engagement of said concave channel with an annular convex flange formed around said hole.

13. A method of restricting use of identification means, comprising the steps of:
(a) providing electronic readable memory means on said identification means;
(b) storing in said memory means limitations as to the use of said identification means;
(c) temporarily attaching said identification means to a terminal such that data communication can take place between said memory means and said terminal over a single connection; and
(d) disabling said memory means if said limitations have been exceeded, by providing a signal to said memory means over said single connection.

14. A method, as defined in claim 13, wherein said step of disabling comprises programming said memory means to prevent further access thereto.

15. A method, as defined in claim 13, wherein said step of disabling comprises opening fusible means with an electrical pulse such as to disable said memory means.

16. A method, as defined in claim 13, wherein said memory means includes a capacitor to power said memory means and said method further comprises the step of: charging, each time said identification means is used, said capacitor with a charge sufficient to power said memory means for only a selected period of time, said capacitor being charged over a data communication line to said memory device when said memory device is temporarily attached to said terminal.

* * * * *